United States Patent
Arakawa

[11] Patent Number: 5,883,501
[45] Date of Patent: Mar. 16, 1999

[54] POWER SUPPLY CIRCUIT

[75] Inventor: Hideki Arakawa, Kanagawa, Japan

[73] Assignee: Sony Corporation, Japan

[21] Appl. No.: 835,987

[22] Filed: Apr. 10, 1997

[30] Foreign Application Priority Data

Apr. 19, 1996 [JP] Japan .................. 8-098908

[51] Int. Cl.[6] .................. G05F 1/10; G05F 1/40
[52] U.S. Cl. .................. 323/222; 323/283; 323/284; 323/315
[58] Field of Search .................. 323/282, 283, 323/284, 285, 351, 315; 363/59, 16, 21; 365/185.01, 195

[56] References Cited

U.S. PATENT DOCUMENTS

| | | | |
|---|---|---|---|
| 4,344,121 | 8/1982 | Weber | 363/16 |
| 4,420,700 | 12/1983 | Fay et al. | 307/571 |
| 5,161,097 | 11/1992 | Ikeda | 363/124 |
| 5,481,221 | 1/1996 | Gariboldi et al. | 327/536 |
| 5,554,925 | 9/1996 | Shibata | 323/282 |
| 5,598,095 | 1/1997 | Schnaittes | 323/315 |

*Primary Examiner*—Peter S. Wong
*Assistant Examiner*—Rajnikant B. Patel
*Attorney, Agent, or Firm*—Ronald P. Kananen; Rader, Fishman & Grauer

[57] ABSTRACT

A power supply circuit provided with an operation control circuit to control the operation of an oscillator, a comparator, and a reference voltage generator by generating a pump enable signal. During normal operation, the operation control circuit generates an active pump enable signal to run the power supply circuit and generate a voltage according to a reference voltage from the reference voltage generator, while during standby, the operation control circuit generates an inactive pump enable signal in response to an internal clock signal from a CPU to make the power supply circuit operate intermittently, whereby the power consumed during standby can be reduced and the time for return to the operating state can be shortened.

6 Claims, 9 Drawing Sheets

FIG. 6A GND 
FIG. 6B PON 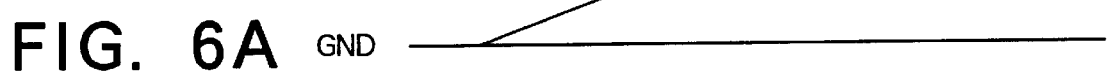
FIG. 6C PENB 
FIG. 6D CLK 
FIG. 6E V$_{OUT}$ 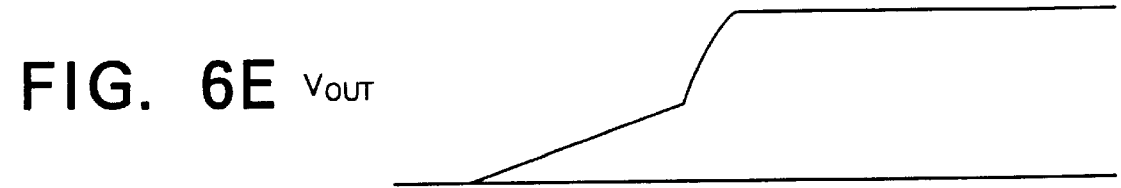

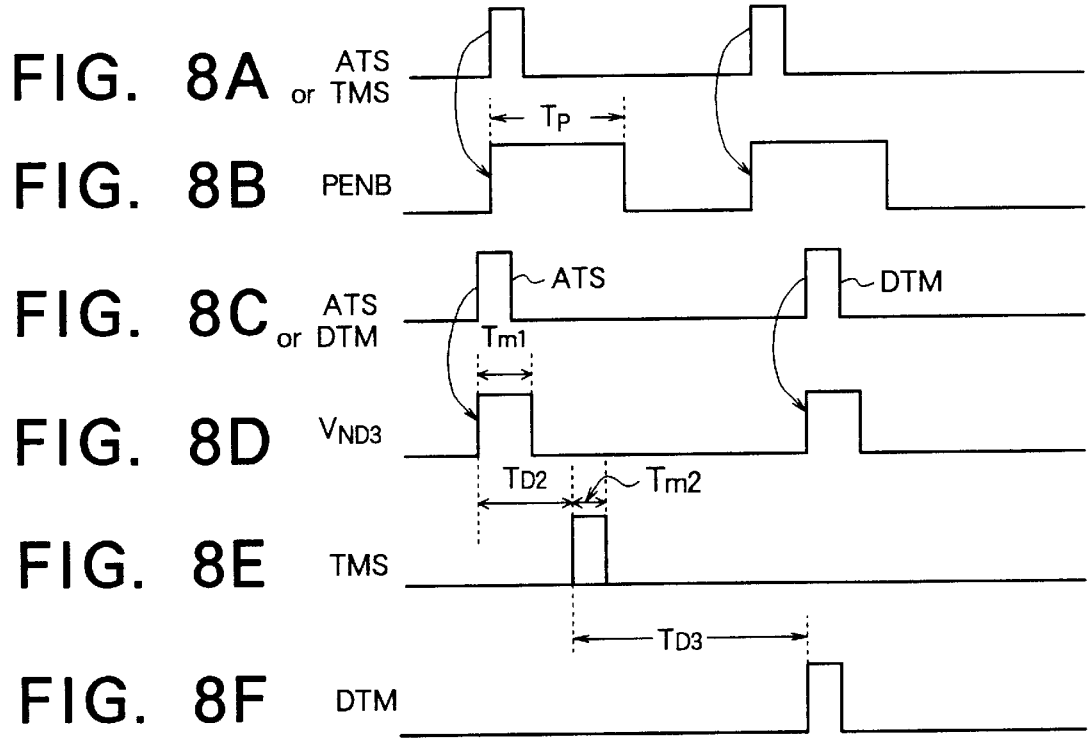

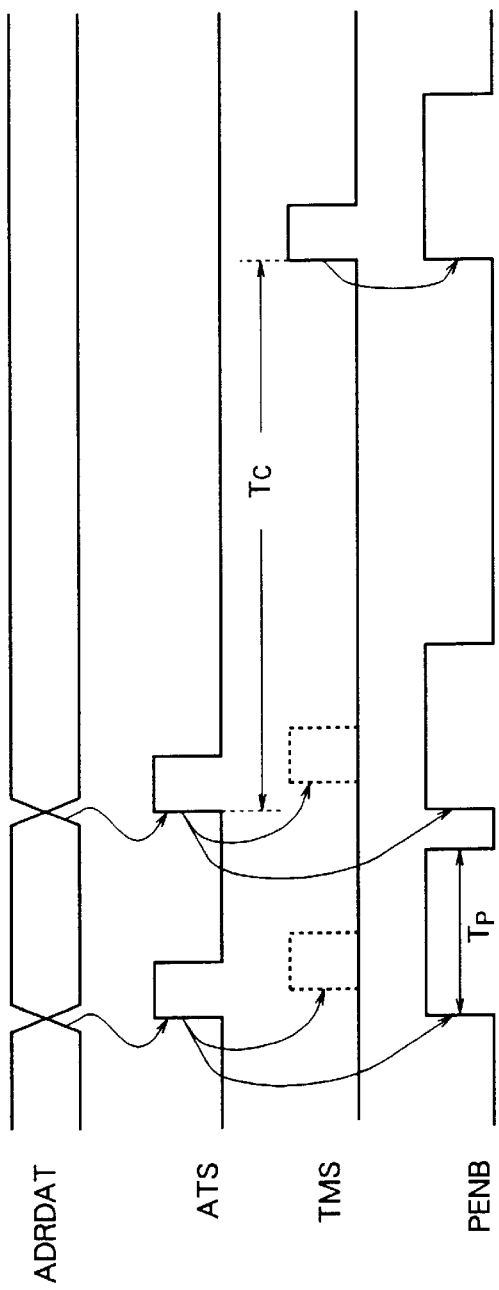

POWER SUPPLY CIRCUIT

BACKGROUND OF THE INVENTION

1. Field of the Invention

The present invention relates to a power supply circuit supplying a boosted voltage to a semiconductor device.

2. Description of the Related Art

Low voltage operations of a flash memory having a single power supply voltage are usually realized by supplying a voltage boosted to the required high voltage from the power supply voltage by a booster circuit on the chip.

For example, in a flash memory operating at a low power supply voltage of 3.3 V or less, a high voltage of, for example, 4 V to 5 V has to be input to the word lines to maintain the access speed during reading and writing.

Usually, a high voltage can be obtained by the method of using a bootstrap circuit or a booster circuit.

A bootstrap circuit uses a large capacitor to increase the voltage in synchronization with an address transition detection (ATD) pulse. The method of using a bootstrap circuit can only increase the power supply voltage $V_{CC}$ by 50% to 60% and therefore is not appropriate for power supply voltages of 3 V or less.

A booster circuit, for example, a charge pump type booster circuit, can output a boosted voltage higher than the power supply voltage by charging and discharging charge pumps formed by capacitors complementarily in response to a clock signal.

FIG. 1 is a circuit diagram of the configuration of a power supply circuit having a booster circuit according to the related art. In FIG. 1, reference number 10 denotes an oscillator, 20 a buffer, 30 a booster circuit, 40 a comparator, 50 a reference voltage generator, $R_{L1}$ and $R_{L2}$ resistors, $ND_0$ a node, and $T_{OUT}$ an output terminal, respectively.

As shown in FIG. 1, a clock signal CLK is generated by the oscillator 10 and is input to the booster circuit 30 after being amplified by the buffer 20. A high voltage $V_{OUT}$ is generated by the booster circuit 30 using the clock signal CLK from the buffer 20 and is output to the output terminal $T_{OUT}$.

The high voltage $V_{OUT}$ output to the output terminal $T_{OUT}$ is divided by the resistors $R_{L1}$ and $R_{L2}$ to generate a divided voltage $V_T$ of the node $ND_0$ in response to the high voltage $V_{OUT}$ and is input to the comparator 40.

The comparator 40 is formed by, for example, a differential amplifier. The voltage $V_T$ of the node $ND_0$ is input to one input $T_1$ of the differential amplifier, while a reference voltage $V_{ref}$ generated by the reference voltage generator 50 is input to the other input $T_2$ of the differential amplifier. The divided voltage $V_T$ of the node $ND_0$ is compared with the reference voltage $V_{ref}$ by the comparator 40. An oscillation control signal OSS is generated for making the oscillator 10 operate when the voltage $V_T$ is lower than the reference voltage $V_{ref}$ and for stopping the oscillator 10 when the voltage $V_T$ is higher than the reference voltage $V_{ref}$ and is input to the oscillator 10.

For example, when the voltage $V_{OUT}$ of the output terminal $T_{OUT}$ falls, the level of the divided voltage $V_T$ of the node $ND_0$ falls accordingly. When the voltage $V_T$ falls under the reference voltage $V_{ref}$ set by the reference voltage generator 50, the active state oscillation control signal OSS is generated by the comparator 40 and output to the oscillator 10. In response to this, for example, the frequency of the clock signal CLK generated by the oscillator 10 increases and the level of the output voltage $V_{OUT}$ of the booster circuit 30 is made higher.

On the other hand, when the voltage $V_{OUT}$ of the output terminal $T_{OUT}$ rises, the level of the divided voltage $V_T$ of the node $ND_0$ rises accordingly. When the voltage $V_T$ becomes higher than the reference voltage $V_{ref}$ set by the reference voltage generator 50, the inactive state oscillation control signal OSS is generated by the comparator 40 and output to the oscillator 10. In response to this, for example, the frequency of the clock signal CLK generated by the oscillator 10 falls and the level of the output voltage $V_{OUT}$ of the booster circuit 30 is made lower.

In this way, the output voltage $V_{OUT}$ of the booster circuit 30 is fed back to the oscillator 10 and the frequency of the clock signal CLK from the oscillator 10 is controlled accordingly so as to hold the level of the boosted voltage $V_{OUT}$ generated by the booster circuit 30 at a constant level.

By using this kind of charge pump type booster circuit, a high voltage can be effectively generated even in the case of a relatively low power supply voltage, for example, one of not more than 3 V.

The power supply circuit of the related art explained above, however, has a disadvantage of consuming power even in the standby state. For example, in the power supply circuit shown in FIG. 1, power is consumed by the comparator 40, the reference voltage generator 50, etc. during standby. During standby, it is only necessary to compensate for the leakage currents in the transistors and diffusion layers, so only a small booster circuit need be operated. While only several hundred microamperes ($\mu$A) of current is consumed at the most, there are applications in which there are problems even with this extent of current consumption.

For example, in a portable electronic device using batteries as a power source, it is desirable to lower the power consumption as much as possible during standby when the microprocessor has a clock function operating at a low voltage and low frequency.

Further, a flash memory is provided with a so-called "deep power down" mode where it stops all circuit operations so as to achieve lower power consumption. However, it takes time for returning to normal operation and it is difficult to handle low frequency operations as well.

SUMMARY OF THE INVENTION

An object of the present invention is to provide a power supply circuit which can reduce the power consumption during standby and can shorten the time for return from standby to the normal operating state.

To achieve the above object, according to a first aspect of the present invention, there is provided a power supply circuit comprising an oscillator for generating a clock signal; a booster circuit for generating a voltage different in level from the power supply voltage in response to the clock signal from the oscillator; a comparison means for comparing the output voltage of the booster circuit with a reference voltage and outputting a run/stop control signal to the oscillator in response to the result of the comparison; and an operation control means for holding the comparison means in an operating state during normal operation and holding at least the comparison means among the oscillator and the comparison means in a stopped state during standby.

According to a second aspect of the present invention, there is provided a power supply circuit comprising an oscillator for generating a voltage signal; a booster circuit for generating a voltage different in level from the power supply voltage in response to the clock signal from the oscillator; a comparison means for comparing the output voltage of the booster circuit with a reference voltage and outputting a run/stop control signal to the oscillator in response to the result of the comparison; and an operation control means for holding the comparison means in an operating state during normal operation and making at least the comparison means among the oscillator and the comparison means operate at predetermined constant intervals during standby.

Preferably, the operation control means controls the operation in response to a signal from the outside.

According to a third aspect of the present invention, there is provided a power supply circuit comprising an oscillator for generating a clock signal; a booster circuit for generating a voltage different in level from the power supply voltage in response to the clock signal from the oscillator and supplying the voltage to a memory accessed in response to an address signal; a comparison means for comparing the output voltage of the booster circuit with a reference voltage and outputting a run/stop control signal to the oscillator in response to the result of the comparison; and an operation control means for holding the comparison means in an operating state when the address signal changes and stopping at least the comparison means among the oscillator and the comparison means when the address signal has not changed for a predetermined time.

According to a fourth aspect of the present invention, there is provided a power supply circuit comprising an oscillator for generating a clock signal; a booster circuit for generating a voltage different in level from a power supply voltage in response to the clock signal from the oscillator and supplying the voltage to a memory accessed in response to an address signal; a comparison means for comparing the output voltage of the booster circuit with a reference voltage and outputting a run/stop control signal to the oscillator in response to the result of the comparison; and an operation control means for holding the comparison means in an operating state when the address signal changes and making at least the comparison means among the oscillator and the comparison means operate at a predetermined constant interval when the address signal has not changed for a predetermined time.

Preferably, the operation control means makes the oscillator and the comparison means operate for a predetermined time after the power is turned on.

According to the present invention, the power supply circuit can generate a voltage different in level from the power supply voltage and supply it to a target circuit. The oscillator is kept operating and a boosted voltage is supplied during normal operation. During standby, at least the comparator for controlling the level of the output voltage in made to stop.

Further, according to the present invention, the oscillator is held in an operating state and the voltage is supplied continuously during normal operation, while at least the comparator is held in the operating state at predetermined intervals during standby. As a result, the power consumption during standby can be reduced.

Furthermore, according to the present invention, the power supply circuit can generate a voltage different in level from the power supply voltage and supply it to, for example, a memory. The operation of the power supply circuit is controlled in response to changes in the address signal. For example, the oscillator may be held in the operating state when the address changed, while at least the comparator may be forced to stop when there is no change in the address signal.

Further, according to the present invention, the oscillator may be held in the operation state when the address signal changes, while the comparator may be held in the operating state at predetermined intervals when there is no change in the address signal during a predetermined time.

As a result, when there is no change of the address signal, the oscillator is held in the operating state at predetermined intervals and the voltage is supplied intermittently. The power consumed due to leakage current etc. is therefore compensated for and the time for return from standby to normal operation can be shortened.

BRIEF DESCRIPTION OF THE DRAWINGS

The above and other objects and features of the present invention will be described in more detail below with reference to the accompanying drawings, in which:

FIGS. 6A to 6E are timing diagrams of the operation after power is turned on in the second embodiment;

FIGS. 8A to 8F are timing diagrams of the pulse generator and the timer; and

FIG. 9A to 9D are timing diagrams of the second embodiment in the operating state.

DESCRIPTION OF THE PREFERRED EMBODIMENT

First Embodiment

Figure 1:
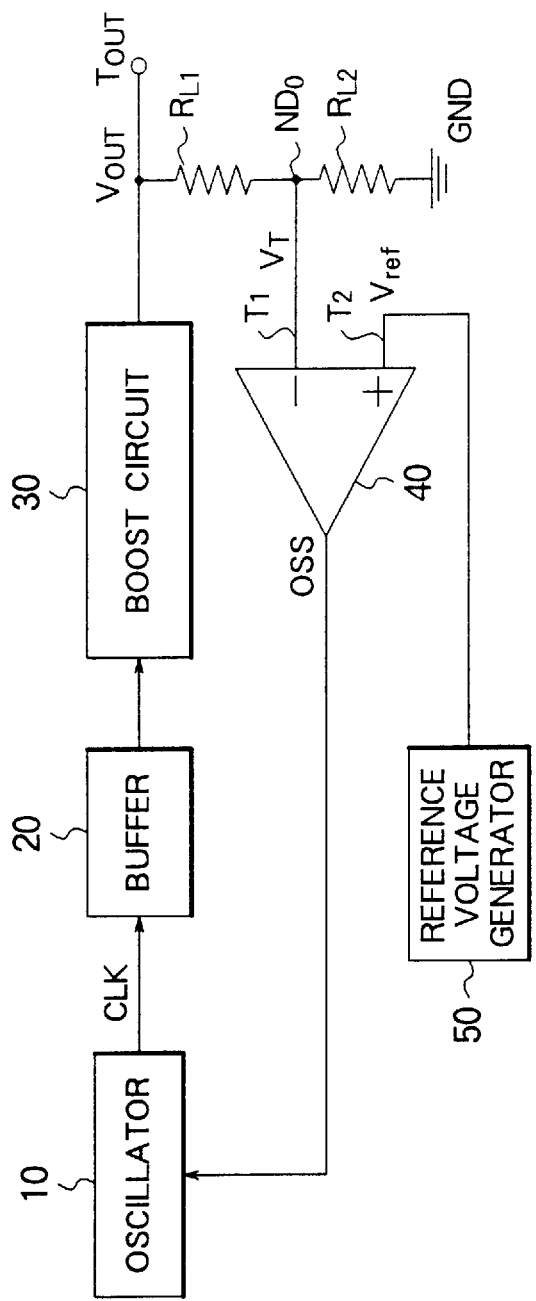
FIG. 1 is a circuit diagram of a power supply circuit according to the related art.
Figure 2:
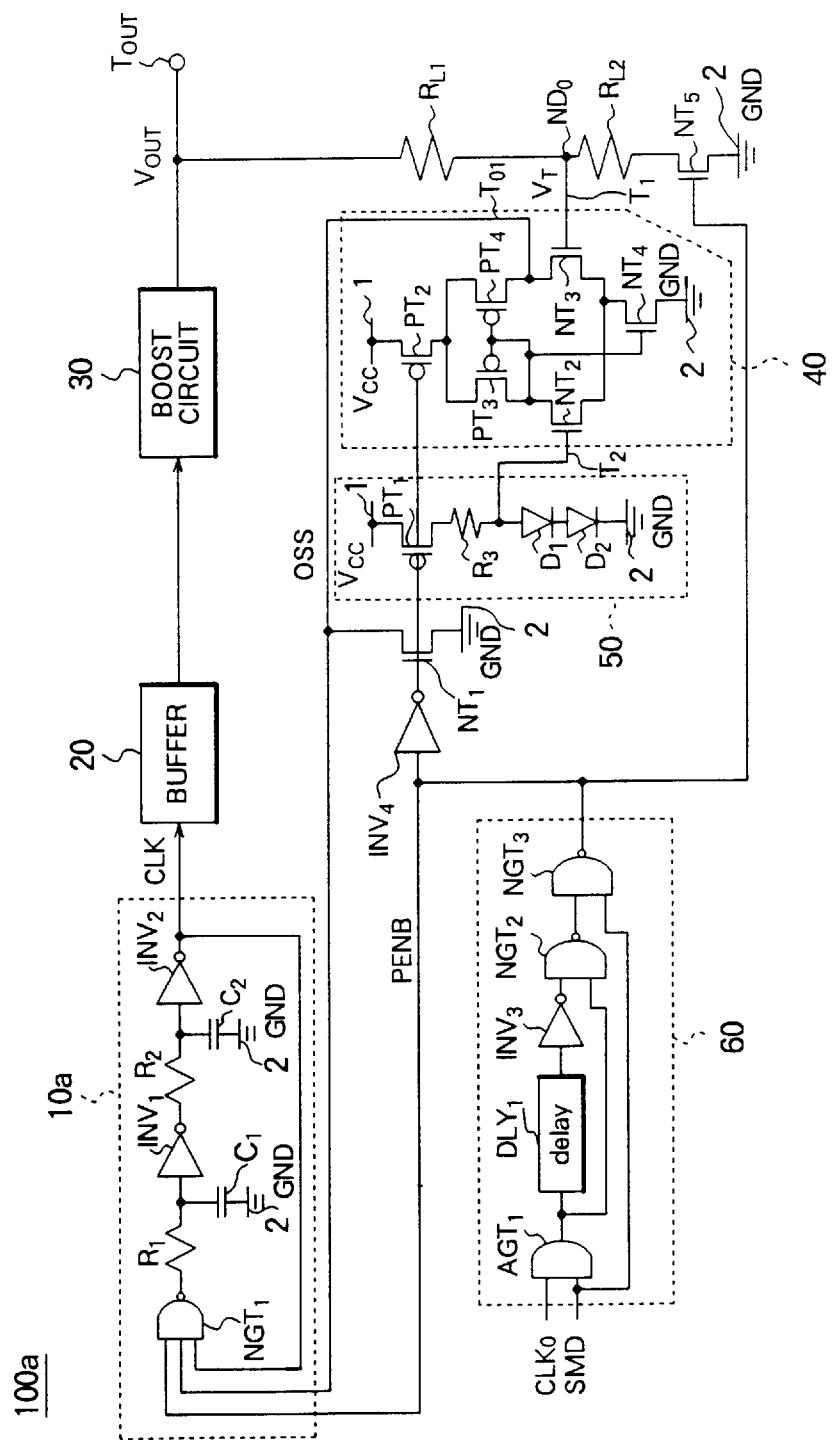
FIG. 2 is a circuit diagram of a first embodiment of a power supply circuit according to the present invention.

FIG. 2 is a circuit diagram of a first embodiment of the power supply circuit according to the present invention and depicts a power supply circuit 100a.

In FIGS. 2, 10a denotes an oscillator, 20 a buffer, 30 a booster circuit, 40 a comparator, 50 a reference voltage generator, 60 an enable signal generator, $R_{L1}$ and $R_{L2}$ resistors, $ND_0$ a node, and $T_{OUT}$ an output terminal, respectively.

The oscillator 10a is constituted by a NAND gate $NGT_1$, inverters $INV_1$ and $INV_2$, resistors $R_1$ and $R_2$, and capacitors $C_1$ and $C_2$. The NAND gate $NGT_1$ has three input terminals—one of which is connected to an output of the oscillator 10a to form an oscillating loop and the other two of which are connected to outputs of the enable signal generator 60 and the comparator 40, respectively—and receives a pump enable signal PENB from the enable signal generator 60 and an oscillation control signal OSS from the comparator 40 to control the run/stop states of the oscillator 10a.

When both the pump enable signal PENB and the oscillation control signal OSS are in the active state, namely, are held at a high level, the oscillator 10a is set at an operating state. The serially connected resistor $R_1$, inverter $INV_1$, resistor $R_2$, inverter $INV_2$, and NAND gate $NGT_1$ form an oscillating loop. A clock signal CLK is output to the output terminal of the oscillator 10a.

When one or both of the pump enable signal PENB and the oscillation control signal OSS are in the inactive state, namely, are held at a low level, the oscillator 10a is set at a stop state and no clock signal CLK is output from it.

The buffer 20 amplifies the clock signal CLK output from the oscillator 10a and supplies it to the booster circuit 30. The booster circuit 30 performs a charge pumping operation in response to the clock signal input from the buffer 20 and outputs a boosted voltage $V_{OUT}$ to the output terminal.

The resistors $R_{L1}$ and $R_{L2}$ and an NMOS transistor $NT_5$ are connected serially between the output terminal and ground. The node $ND_0$ is constituted by the connection point of the resistors $R_{L1}$ and $R_{L2}$ while the gate of the NMOS transistor $NT_5$ is connected to the output of the enable signal generator 60 to receive the pump enable signal PENB. As a result, when the pump enable signal PENB is set at the active state (high level state), the NMOS transistor $NT_5$ is on (i.e., in the conductive state), while when the pump enable signal PENB is set at the inactive state (low level state), the NMOS transistor $NT_5$ is off (i.e., in the non-conductive state).

The comparator 40 is constituted by a differential amplifier formed by PMOS transistors $PT_2$, $PT_3$, and $PT_4$ and NMOS transistors $NT_2$, $NT_3$, and $NT_4$. Between the differential amplifier and a power supply line 1 is connected a PMOS transistor $PT_2$ with a gate connected to an output of an inverter $INV_4$, while between the differential amplifier and the ground line 2 there is connected an NMOS transistor $NT_4$ with a gate connected to an output $T_{01}$ of the differential amplifier.

One input $T_1$ of the differential amplifier is connected to the node $ND_0$ and receives the voltage $V_T$ of the node $ND_0$, while the other input $T_2$ of the differential amplifier is connected to an output of the reference voltage generator 50 and receives the reference voltage $V_{ref}$ generated by the reference voltage generator 50.

Therefore, when both the PMOS transistor $PT_2$ and the NMOS transistor $NT_4$ are on, the comparator 40 formed by the differential amplifier operates and compares the voltage $V_T$ of the node $ND_0$ input to the input terminal $T_1$ and the reference voltage $V_{ref}$ input to the input terminal $T_2$. When the voltage $V_T$ of the node $ND_0$ is higher than the reference voltage $V_{ref}$, the output $T_{01}$ of the comparator 50 is the low level, for example, the ground level, while when the voltage $V_T$ of the node $ND_0$ is lower than the reference voltage $V_{ref}$, the output $T_{01}$ of the comparator 50 is the high level, for example, the level of the power supply voltage $V_{CC}$. The output signal of the output terminal $T_{01}$ is input to the oscillator 10a as an oscillation control signal OSS.

The reference voltage generator 50 is comprised by a PMOS transistor $PT_1$, a resistor $R_3$, and diodes $D_1$ and $D_2$ connected serially between the power supply line 1 and the ground line 2. A gate of the PMOS transistor $PT_1$ is connected to the output of an inverter $INV_4$, and the connection point of the resistor $R_3$ and diode $D_1$ is connected to the input $T_2$ of the comparator 40.

When the PMOS transistor $PT_1$ is on, the reference voltage generator 50 operates. The reference voltage $V_{ref}$ is generated and input to the input terminal $T_2$ of the comparator 40. Here, if the threshold voltages of the diode $D_1$ and $D_2$ at the time of forward bias are both $V_{TH}$, the reference voltage $V_{ref}$ is set as 2 $V_{TH}$ when the reference voltage generator 50 operates.

The output terminal $T_{01}$ of the comparator 40 is grounded through a NMOS transistor $NT_1$. A drain of the NMOS transistor $NT_1$ is connected to the output terminal $T_{01}$ of the comparator 40, a gate of the NMOS transistor $NT_1$ is connected to the output terminal of the inverter $INV_4$, and a source of the NMOS transistor $NT_1$ is grounded.

An input terminal of the inverter $INV_4$ is connected to an output terminal of the enable signal generator 60, and a pump enable signal PENB is input. Therefore, an inverse signal of the pump enable signal PENB is output to the output terminal of the inverter $INV_4$. When the pump enable signal PENB is in an active state, a low level signal is output to the output terminal of the inverter $INV_4$, and both the comparator 40 and the reference voltage generator 50 are set in the operating state and the NMOS transistor $NT_1$ is set in the off state.

On the other hand, when the pump enable signal PENB is in an inactive state, a high level signal is output to the output terminal of the inverter $INV_4$, both the comparator 40 and the reference voltage generator 50 are set in the stopped state and the NMOS transistor $NT_1$ is set in an on state. In this case, the output terminal $T_{01}$ of the comparator 40 is grounded through the on state NMOS transistor $NT_1$ and the oscillation control signal OSS is set at a low level, namely, in the inactive state.

The enable signal generator 60 is constituted by an AND gate $AGT_1$, a delay circuit $DLT_1$, an inverter $INV_3$, and NAND gates $NGT_2$ and $NGT_3$.

An internal clock signal $CLK_0$ and a control signal SMD from a not illustrated microprocessor are input to two input terminals of the NAND gate $NGT_2$. The output terminal of the AND gate $AGT_1$ is connected to one of the input terminals of the NAND gate $NGT_2$ through the delay circuit $DLT_1$ and the inverter $INV_3$, while the output terminal of the AND gate $AGT_1$ is connected to the other input terminal of the NAND gate $NGT_2$ through the delay circuit $DLT_1$ and the inverter $INV_3$.

The output terminal of the NAND gate $NGT_2$ is connected to one of the input terminals of the NAND gate $NGT_3$. The control signal SMD from the microprocess is input to the other input of the NAND gate $NGT_3$.

Below, the embodiment of the power supply circuit will be described with reference to the configuration of the power supply circuit, the configuration of the one chip microprocessor shown in FIG. 3, and the timing diagram of the signals shown in FIGS. 4A to 4C.

Figure 3:
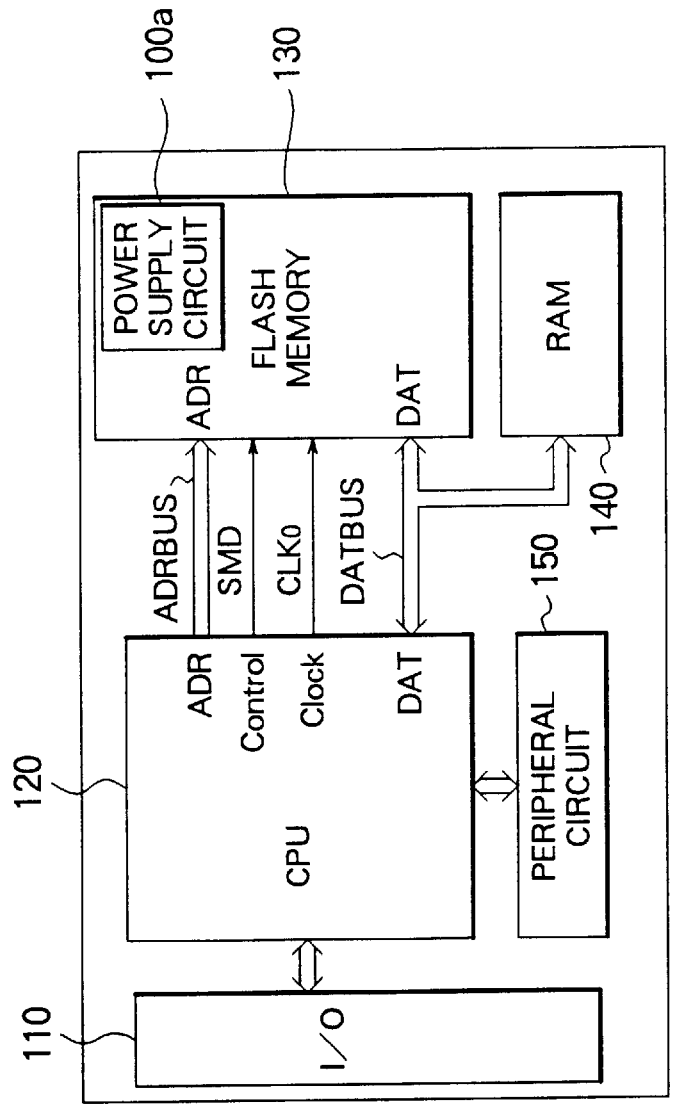
FIG. 3 shows a configuration of a one-chip microprocessor with a memory.

FIG. 3 depicts the configuration of a one chip microprocessor with, for example, a built-in flash memory. As shown in FIG. 3, the one-chip microprocessor is constituted by an interface 110, a CPU 120, a flash memory 130, a random access memory (RAM) 140, and a peripheral circuit 150 having an analog-digital converter (ADC) etc. The flash memory 130 is equipped with the power supply circuit 100a depicted in FIG. 2.

The CPU 120 inputs or outputs data through the interface 110 from or to the outside. In addition, the CPU 120 outputs address data to the flash memory 130 through an address bus ADRBUS to select the memory. Further, the CPU 120 reads data from or writes data to the flash memory 130 through a data bus DATBUS.

The access operations for reading or writing are controlled by control signals, for example, an internal clock signal $CLK_0$, a control signal SMD, etc. The power supply circuit 100a operates under the control of the CPU 120 by these signals to generate a stabilized high voltage and supply it to the flash memory 130.

While not shown, the address bus ADRBUS and data bus DATBUS are connected between the CPU 120 and the RAM 140. The CPU 120 controls the access to the RAM 140 and the operation of the peripheral circuit 150 by control signals.

Figure 4:
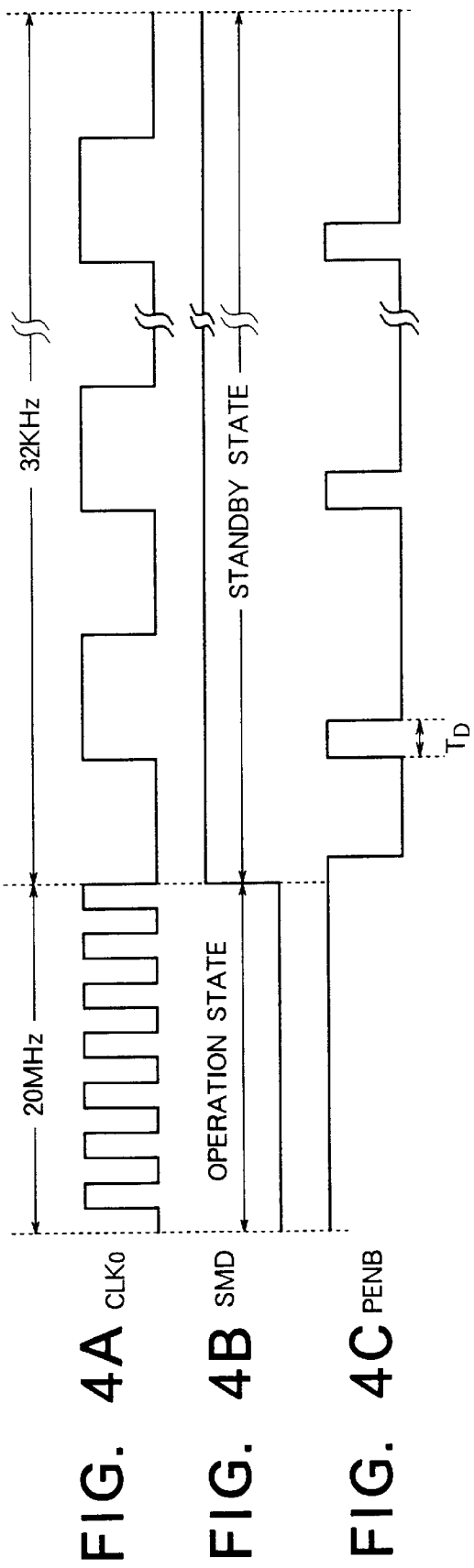
FIGS. 4A to 4C are timing diagrams for the normal operation and standby of the first embodiment.

FIGS. 4A to 4C are timing diagrams of the internal clock signal $CLK_0$ and the control signal SMD input to the flash memory 130 from the CPU 120 and the output signals of the power supply circuit during operation controlled by these control signals. FIG. 4A is a timing diagram of the clock signal $CLK_0$, FIG. 4B a timing diagram of the control signal SMD, and FIG. 4C a timing diagram of the pump enable signal PENB generated by the enable signal generator 60.

The clock signal $CLK_0$ is an internal clock signal of the microprocessor for accessing the flash memory 130. The frequency of the clock signal $CLK_0$ is variable. During normal operation, the frequency is, for example, 20 MHz, while during standby, it is, for example, 32 kHz. The control signal SMD instructs the operating state of the CPU 120. During normal operation, the control signal SMD is set at the low level, while during standby the control signal SMD is set at the high level. Namely, when the clock frequency is 20 MHz, the control signal SMD is set at the low level, while when the clock frequency is 32 kHz, the control signal SMD is set at the high level.

Since the control signal is held at an inactive low level, the enable signal generator 60 shown in FIG. 2 receives the low level control signal SMD at one of the input terminals of the NAND gate $NGT_3$ and the output signal of the NAND gate $NGT_3$ is set at a high level. Namely, the pump enable signal PENB is held at an active high level.

When the pump enable signal PENB is in the active state, both the comparator 40 and the reference voltage generator 50 are set in the operating states. The voltage $V_{OUT}$ of the output terminal $T_{OUT}$ is divided by the resistors $R_{L1}$ and $R_{L2}$, and the voltage $V_T$ of the node $ND_0$ is found by the following equation:

$$V_T = V_{OUT} \cdot r_{L2}/(r_{L1}+r_{L2}) \qquad (1)$$

where $r_{L1}$ and $r_{L2}$ are resistances of the resistors $R_{L1}$ and $R_{L2}$.

When the voltage $V_T$ of the node $ND_0$ is higher than the reference voltage $V_{ref}$ generated by the reference voltage generator 50, a low level oscillation control signal OSS is output from the comparator 40 and input to the oscillator 10a.

In the oscillator 10a, when the low level oscillation control signal OSS is input to the NAND gate $NGT_1$, the oscillation stops and no clock signal CLK is output. Accordingly, the boost operation of the booster circuit 30 stops and the output voltage $V_{OUT}$ of the booster circuit 30 decreases.

On the other hand, when the voltage $V_T$ of the node $ND_0$ is lower than the reference voltage $V_{ref}$ set by the reference voltage generator 50, a high level oscillation control signal OSS is output from the comparator 40 and input to the oscillator 10a.

When the high level oscillation control signal OSS is input to the NAND gate $NG_1$, the oscillation is carried out and the clock signal CLK is generated and input to the booster circuit 30 through the buffer 20. The booster circuit 30 performs a boost operation and increases the output voltage $V_{OUT}$ of the booster circuit 30.

As described above, during normal operation in the power supply circuit 100a, the low level control signal SMD is obtained from the CPU 120 and the active pump enable signal PENB is output from the enable signal generator 60. In response to this, the comparator 40 and the reference voltage generator 50 are set in the operating state and the output voltage $V_{OUT}$ of the booster circuit 30 is held at a level according to the reference voltage $V_{ref}$ set by the reference voltage generator 50. For example, as mentioned above, if both the threshold voltages of the diodes $D_1$ and $D_2$ comprising the reference voltage generator 50 at the time of forward bias are $V_{TH}$, the reference voltage $V_{ref}$ is set as $V_{ref}=2V_{TH}$ by the reference voltage generator 50. The comparator 40 outputs the oscillation control signal OSS which adjusts the voltage $V_T$ of the node $ND_0$ to approach the reference voltage $V_{ref}$. Namely, the voltage is set as $V_T=V_{ref}=2V_{TH}$.

From equation (1), the output voltage $V_{OUT}$ of the booster circuit 30 can be obtained by the following equation:

$$V_{OUT}=2V_{TH}(r_{L1}+r_{L2})/r_{L3} \qquad (2)$$

Here, the resistance of the NMOS transistor $NT_5$ connected between the resistor $R_{L2}$ and ground is not considered. This is because the resistance of the NMOS transistor $NT_5$ is a small one of several kΩ while the resistances of the resistors $R_{L1}$ and $R_{L2}$ are more than several hundred kΩ.

During normal operation, a stabilized voltage $V_{OUT}$ shown in equation (2) is generated by the power supply circuit 100a and supplied to the flash memory shown in FIG. 3. As shown in FIG. 4A, the clock signal $CLK_0$ of the frequency of 32 kHz is output by CPU 120 during standby, and the control signal SMD is switched to the high level.

In the power supply circuit shown in FIG. 2, the high level control signal SMD is input to the AND gate $AGT_1$, so the output level of the AND gate $AGT_1$ is decided by the clock signal $CLK_0$. At a leading edge of the clock signal $CLK_0$, the level of the output signal of the AND gate $AGT_1$ changes from low to high. The output of the AND gate $AGT_1$ is delayed by the delay circuit $DLY_1$ by the delay time $T_D$, inverted by the inverter $INV_3$, and input to a NAND gate $NGT_2$ along with the output signal of the AND gate $AGT_1$. A negative pulse with a pulse width $T_D$ is generated by the NAND gate $NGT_2$ and input to the NAND gate $NGT_3$. The output of the NAND gate $NGT_2$ is inverted by the NAND gate $NGT_3$, a positive pulse with a pulse width TD is generated, and the pulse is output as the pump enable signal PENB.

In this way, during standby, a pulse with a pulse width $T_D$ is generated from the leading edge of the clock signal $CLK_0$ from CPU 120 in accordance with the delay time of the delay circuit $DLY_1$, is output as the pump enable signal PENB, and is input to the oscillator 10a, the comparator 40, and the reference voltage generator 50.

When the pump enable signal PENB is in the inactive state, namely at the low level, since the oscillator 10a, the comparator 40, and the reference voltage generator 50 are set in the non-operating state, the power supply circuit 100a stops. In response to the clock signal $CLK_0$, the pulse with the pulse width $T_D$ is generated from the leading edge of the clock signal $CLK_0$ by the enable signal generator 60. The pulse is supplied to the oscillator 10a, the comparator 40, and the reference voltage generator 50 as the pump enable signal PENB. Receiving this, the comparator 40 outputs an oscillation control signal OSS to the oscillator 10a so that the voltage $V_T$ of the node $ND_0$ becomes substantially the same as the reference voltage $V_{ref}$. In response to this, the oscillator 10a operates to generate the $V_{ref}$ clock signal CLK and input it to the booster circuit 30.

When in the operating state, since the control signal SMD is set at the low level, the high level pump enable signal PENB is generated by the enable signal generator 60 and the oscillator 10a is controlled to operate continuously.

On the other hand, when in the standby state, the control signal SMD is set at the high level and a pump enable signal PENB intermittently becoming a high level in synchronization with the internal clock signal $CLK_0$ from the CPU 120 is generated by the enable signal generator 60 and input to the oscillator 10a. According to this, the oscillator 10a is controlled to operate intermittently and the power consumed by the leakage current of the flash memory 130 is compensated for intermittently during standby.

In this way, the voltage $V_{OUT}$ shown in equation (2) is supplied to the flash memory 130 by the power supply circuit 100a in the interval $T_D$ from the leading edge of the clock signal $CLK_0$ from the CPU 120.

The power supply circuit 100a stops at the falling edge of the pump enable signal PENB and the power supplied by the power supply circuit 100a is consumed by the flash memory 130. Note that the currents consumed in the access of the flash memory 130 are the charge and discharge currents of the load capacitance of the MOS transistors and are instantaneous. As opposed to this, in the interval $T_D$ from the leading edge of the clock signal $CLK_0$, a boost operation is carried out by the power supply circuit 100a and the power consumed by the access of the flash memory 130 is compensated for.

The delay time of the delay circuit $DLY_1$ is adjusted according to the power consumed by the access of the flash memory 130. For example, by setting the delay time $T_D$ to 300 ns, the power consumed by access of the flash memory 130 during standby is compensated for at the leading edge of the clock signal $CLK_0$, whereby the normal operation of the flash memory 130 during standby is guaranteed and a reduction of the power consumption can be realized.

In this first embodiment, as shown in FIG. 2, the reference voltage $V_{ref}$ is set by the reference voltage generator 50 with the threshold voltage $V_{TH}$ of the diodes $D_1$ and $D_2$ at the time of forward bias. Further, in the comparator 40, a differential amplifier is used to compare the divided voltage $V_T$ of the resistors $R_{L1}$ and $R_{L2}$ with the reference voltage $V_{ref}$ and the oscillation control signal OSS is generated accordingly. The present invention is not, however, limited to this embodiment. For example, it is possible to use some other constant voltage generating means to generate the reference voltage $V_{ref}$, use this as a reference to generate the oscillation control signal OSS, and adjust the output voltage $V_{OUT}$ to a desired level. For example, it is possible to generate a more precise reference voltage $V_{ref}$ than by diodes by using a band gap reference generating circuit.

As described above, according to this embodiment, an enable signal generator 60 is used to generate the pump enable signal PENB for controlling the operations of the oscillator 10a, the comparator 40, and the reference voltage generator 50 and generating the boosted voltage $V_{OUT}$. During normal operation, the enable signal generator 60 outputs the active pump enable signal PENB. The power supply circuit 100a operates and generates the voltage $V_{OUT}$ in accordance with the reference voltage $V_{ref}$ generated by the reference voltage generator 50. On the other hand, during standby, since the pump enable signal PENB activated in the interval $T_D$ from the leading edge of the clock signal $CLK_0$ is generated in response to the internal clock signal $CLK_0$ from the CPU 120 and the power supply circuit 100a operates accordingly, the voltage $V_{OUT}$ is generated intermittently in response to the reference voltage $V_{ref}$ and the power consumed during standby can be lowered.

Figure 5:
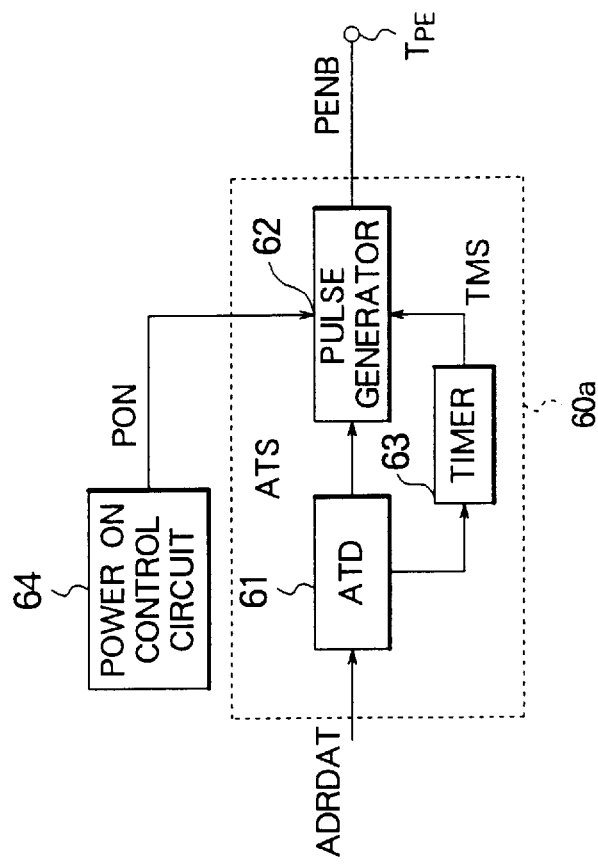
FIG. 5 is a block diagram of a second embodiment of a power supply circuit according to the present invention.

Below, a second embodiment of the present invention will be described. FIG. 5 is a block diagram of the second embodiment of the present invention and shows in particular an enable signal generator 60a.

In this second embodiment, the oscillator 10a, buffer 20, booster circuit 30, comparator 40, and reference voltage generator 50 are identical in configuration to those in the first embodiment. Therefore, descriptions of these parts will be omitted, and only the enable signal generator 60a, which is different from that in the first embodiment, will be described in detail.

In the second embodiment, the operation of the power supply circuit $100_b$ is controlled by an address transition signal ATS from an address transition detector ATD when no clock signal $CLK_0$ or control signal SMD which differ between normal operation and standby, are received from the CPU.

As shown in FIG. 5, the enable signal generator 60a of the second embodiment is constituted by an address transition detector 61, a pulse generator 63, and a timer 63. The address transition detector 61 receives address data ADRDAT and outputs an address transition signal ATS when a transition of the address is detected.

The pulse generator 62 receives the address transition signal ATS and the timer signal TMS from the timer 63 and outputs a pulse with a width of $T_P$ in response to the received signals.

A power on control circuit 64 outputs a control signal PON when the power is switched on. In response to this signal, the pulse generator 62 generates a pump enable signal PENB held at high level at an interval $T_S$ and outputs it to the oscillator 10a. In response to this, the booster circuit 30 operates continuously at the interval $T_S$ after the power is turned on, and the boosted voltage $V_{OUT}$ rises rapidly.

FIGS. 6A to 6E are timing diagrams of the power supply voltage $V_{CC}$, the control signal PON output from the power on control circuit 64, the pump enable signal PENB output from the pulse generator 62, the clock signal CLK generated by the oscillator 10a, and the output voltage $V_{OUT}$ of the booster circuit 30 during the power on period.

After the power is turned on, the power supply voltage rises from 0 V to $V_{CC}$ gradually. At the time $t_0$, the control signal PON is output from the power on control circuit. In response to this, a pulse with a width of, for example, 10 µs is generated by the pulse generator 62 and is output to the oscillator 10a as the pump enable signal PENB. The reference voltage generator 50 acting as a voltage control means, the comparator 40, and the oscillator 10a operate during the period when the pump enable signal PENB is held at the high level. In response to this, the clock signal CLK is generated and output to the booster circuit 30. The booster circuit 30 operates in response to the clock signal CLK and the output voltage $V_{OUT}$ rises in a short period.

The address data ADRDAT is input to the address transition detector 61. The transition of the address data ADRDAT is detected by the address transition detector 61. When the address data ADRDAT changes, the address transition signal ATS is generated by the address transition detector 61 and output to the pulse generator 62. In response to this, the pulse generator 62 generates a pulse with a width of $T_P$ and outputs it as the pump enable signal PENB to the oscillator 10a, the comparator 40, and the reference voltage generator 50, respectively.

On the other hand, the timer 63 receives an address transition signal ATS from the address transition detector 61, generates a timer signal TMS at intervals of time Tm, and outputs the same to the pulse generator 62. In response to the timer signal TMS, the pulse generator 62 generates a pulse signal with a width of $T_P$ and outputs it as the pump enable signal.

Figure 7:
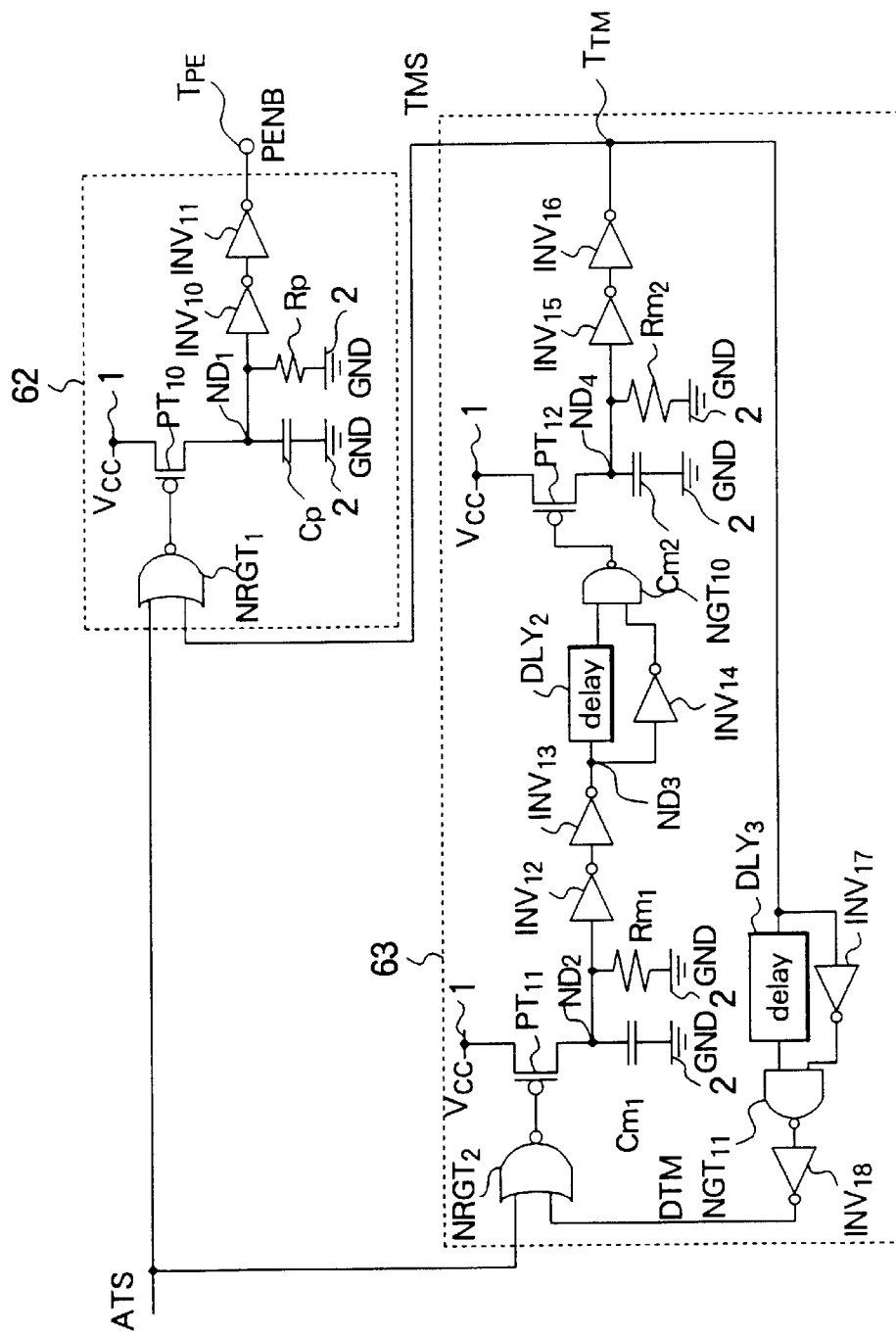
FIG. 7 is a circuit diagram of a pulse generator and a timer of the second embodiment.

FIG. 7 is a circuit diagram of the detailed configuration of the pulse generator 62 and the timer 63. Since the address transition detector 61 is identical in configuration to the address transition detectors generally used, a detailed description will be omitted.

As shown in FIG. 7, the pulse generator 62 is constituted by a NOR gate $NRGT_1$, a PMOS transistor $PT_{10}$, a capacitor $C_P$, a resistor $R_P$, and inverters $INV_{10}$ and $INV_{11}$. The timer 63 is constituted by a NOR gate $NRGT_2$, PMOS transistors $PT_{11}$ and $PT_{12}$, capacitors $C_{m1}$ and $C_{m2}$, resistors $R_{m1}$ and $R_{m2}$, inverters $INV_{12}$, $INV_{13}$, ... $INV_{18}$ delay circuits $DLY_2$ and $DLY_3$, and NAND gates $NGT_{10}$ and $NGT_{11}$.

In the pulse generator 62, the address transition signal ATS from the address transition detector 61 and the timer signal TMS from the timer 63 are input to the input terminals of the NOR gate $NRGT_1$, respectively. An output terminal of the NOR gate is connected to a gate of the PMOS transistor $PT_{10}$. A source of the PMOS transistor $PT_{10}$ is connected to the power supply line 1 while a drain of the PMOS transistor $PT_{10}$ is connected to a node $ND_1$.

Between the node $ND_1$ and a ground line 2, the capacitor $C_P$ and the resistor $R_P$ are connected in parallel. The inverters $INV_{10}$ and $INV_{11}$ are connected in series between the node $ND_1$ and the output terminal $T_{PE}$ of the pump enable signal PENB.

In the timer 63, the address transition signal ATS from the address transition detector 61 and the delay signal DTM of the timer signal TMS are input to the input terminals of the NOR gate $NRGT_2$ respectively. An output of NOR gate $NRGT_2$ is connected to a gate of the PMOS transistor $PT_{11}$. A source of the PMOS transistor $PT_{11}$ is connected to the power supply line 1 while a drain of the PMOS transistor $PT_{11}$. is connected to a node $ND_2$.

Between the node $ND_2$ and the ground line 2, the capacitor $C_{m1}$ and the resistor $R_{m1}$ are connected in parallel. The inverters $INV_{12}$ and $INV_{13}$ are connected in series between a node $ND_2$ and a node $ND_3$.

The node $ND_3$ is connected to one of the inputs of the NAND gate $NGT_{10}$ through the delay circuit $DLY_2$ and further connected to the other input of the NAND gate $NGT_{10}$ through the inverter $INV_{14}$. The output of the NAND gate $NGT_{10}$ is connected to a gate of the PMOS transistor $PT_{12}$. A source of the $PT_{12}$ is connected to the power supply line 1 while a drain of the $PT_{12}$ is connected to a node $ND_4$.

Between the node $ND_4$ and the ground line 2, the capacitor $C_{m2}$ and the resistor $R_{m2}$ are connected in parallel, while between the node $ND_4$ and an output terminal $T_{TM}$ of the timer signal TMS, the inverters $INV_{15}$ and $INV_{16}$ are connected in series.

The output terminal $T_{TM}$ is connected to one of the inputs of NAND gate $NGT_{11}$ through the delay circuit $DLY_3$ and further connected to the other input of the NAND gate $NGT_{11}$ through the inverter $INV_{17}$. The output of the NAND gate $NGT_{11}$ is connected to one of the inputs of the NOR gate $NRGT_2$ through the inverter $INV_{18}$.

The pulse generator 62 generates pulse signals with a width of $T_P$ in response to the rising edges of the address transition signal ATS or the timer signal TMS and outputs the generated pulses as the pump enable signal PENB.

At the rising edge of the address transition signal ATC or the timer signal TMS, the output of the NOR gate $NRGT_1$ changes from the high level to low level. Accordingly, the PMOS transistor $PT_{10}$ is turned on and a charge current flows from the power supply line 1 to the node $ND_1$ through the transistor $PT_{10}$ and the capacitor $C_P$ is charged. The potential of the node $ND_1$ rises and approaches the level of the power supply voltage $V_{CC}$.

On the other hand, at the falling edge of the address transition signal ATS or the timer signal TMS, the output of the NOR gate $NRGT_1$ changes from the low level to the high level. Accordingly, the PMOS transistor $PT_{10}$ turns off. When the PMOS transistor is off, the capacitor $C_P$ discharges through the resistor $R_P$ and the potential of the node $ND_1$ falls to the ground level.

Since the node $ND_1$ is connected to the output terminal $T_{PE}$ of the pump enable signal PENB through the inverters $INV_{10}$ and $INV_{11}$, during the period when the potential of the node $ND_1$ is held higher than the threshold voltage of the inverter $INV_{10}$, the output terminal $T_{PE}$ is set at the high level, namely, an active pump enable signal PENB is output. On the other hand, when the potential of the node $ND_1$ is lower than the threshold voltage of the inverter $INV_{10}$, the output terminal $T_{PE}$ is set low, namely an inactive pump enable signal PENB is output.

The interval $T_P$ during which the pump enable signal PENB is held at the high level is determined in accordance with the value of the power consumption in the flash memory 130. For example, if the power consumed during one access following a change of the address signal can be compensated for by an operation of the booster circuit 30 in a period of 550 ns, the capacitance of the capacitor $C_P$ and the resistance of the resistor $R_P$ can be set to make the time $T_P$ 550 ns.

FIGS. 8A and 8B are timing diagrams of input signals and output signals, namely the pump enable signal PENB of the pulse generator 62. When the address transition signal ATS from the address transition detector 61 or the timer signal TMS from the timer 63 is input to the pulse generator 62, a pulse with a width of $T_P$ is generated from the rising edge of the input signals and output to the terminal $T_{PE}$ as the pump enable signal PENB.

Considering a long period of no access, the timer signal TMS is generated at intervals $T_m$ and the pump enable signal PENB is generated in response to the timer signal.

In the timer 63, the address transition signal ATS from the address transition detector 61 or the timer signal DTM delayed by the delay signal DTM are input to the input terminal of the NOR gate $NRGT_2$.

When the address data ADRDAT changes, an active address transition signal ATS is output from the address transition detector 61. In the timer 63, when the address transition signal ATS or the delay signal DTM are at an active high level, a low level signal is output to the output terminal of the NOR gate $NRGT_2$. Accordingly, the PMOS transistor $PT_{11}$ is on.

When the PMOS transistor $PT_{11}$ is on, the capacitor $C_{m1}$ is charged by the power supply voltage $V_{CC}$ through the PMOS transistor. The potential of the node $ND_2$ is held at the level of the power supply voltage $V_{CC}$. When the address transition signal ATS or the delay signal DTM input to the NOR gate $NRGT_2$ changes to the low level, the PMOS transistor $PT_{11}$ turns off. The capacitor $C_{m1}$ discharges through the resistor $R_{m1}$ and the potential of the node $ND_2$ falls to the ground level GND.

Since the node $ND_2$ is connected to the node $ND_3$ through the inverters $INV_{12}$ and $INV_{13}$, during the period when the potential of the node $ND_2$ is held higher than a threshold voltage of the inverter $INV_{12}$, the node $ND_3$ is held at high level, for example, the level of the power supply voltage $V_{CC}$. On the other hand, when the potential of the node $ND_2$ is lower than the threshold voltage of the inverter $INV_{12}$, the node $ND_3$ is held at the low level, for example, the level of the ground GND.

In this way, a pulse signal with a width of $T_{m1}$ set by the capacitance of the capacitor $C_{m1}$ and the resistance of the resistor $R_{m1}$ from the rising edge of the input signal of the NOR gate $NRGT_2$ is obtained in the node $ND_3$.

The node $ND_3$ is connected to inputs of the NAND gate $NGT_{10}$ through the delay circuit $DLY_2$ and the inverter INV$_{14}$ respectively. Here, if the delay time of the delay circuit DLY$_2$ is T$_{D2}$, a negative pulse with a width of T$_{m1}$ is output to the NAND gate NGT$_{10}$ after the time T$_{D2}$ from the rising edge of the address transition signal ATS or the delayed timer signal DTM input to the NOR gate NRGT$_2$.

Since the output terminal of the gate NGT$_{10}$ is connected to the gate of the PMOS transistor PT$_{12}$, the PMOS transistor PT$_{12}$ is on during the period when the output signal of the NAND gate NGT$_{10}$ is held at the low level, while the PMOS transistor PT$_{12}$ is off in the other periods.

When the PMOS transistor PT$_{12}$ is on, the capacitor C$_{m2}$ is charged by the power supply voltage V$_{CC}$ and the potential of the node ND$_4$ is held at the level of V$_{CC}$. When PMOS transistor PT$_{12}$ turns off, the capacitor C$_{m2}$ discharges through the resistor R$_{m2}$ and the potential of the node ND$_4$ falls to the ground level GND. Since the node ND$_4$ is connected to the output terminal T$_{TM}$ of the timer signal TMS, during the period when the potential of the node ND$_4$ is held higher than a threshold voltage of the inverter INV$_{15}$, the output terminal T$_{TM}$ of the timer signal TMS is held at a high level, for example, the level of the power supply voltage V$_{CC}$, while when the potential of the node ND$_4$ falls under the threshold voltage of the inverter INV$_{15}$, the output terminal T$_{TM}$ of the timer signal TMS is held at a low level, for example, the ground level GND.

In this way, a pulse signal of T$_{m2}$ in width from the falling edge of the output of the NAND gate NGT$_{10}$ is output from the output terminal T$_{TM}$ of the timer signal TMS. Further the width T$_{m2}$ is determined by the capacitance of the capacitor C$_{m2}$ and the resistance of the resistor R$_{m2}$.

The timer signal TMS output from the output terminal T$_{TM}$ is input to the NOR gate NRGT$_1$ of the pulse generator 62 and the delay circuit DLY$_3$ and the inverter INV$_{17}$ connected in parallel in the timer 63. The output signals of the delay circuit DLY$_3$ and the inverter INV$_{17}$ are input to the NAND gate NGT$_{11}$, and the output terminal of the NAND gate NGT$_{11}$ is connected to the input terminal of the NOR gate NRGT$_2$ through the inverter INV$_{18}$.

Here, if the delay time of the delay circuit DLY$_3$ is T$_{D3}$, a pulse of T$_{m2}$ in width after T$_{D3}$ from the rising edge of the timer signal TMS is output from the inverter INV$_{18}$. The pulse is input to the NOR gate NRGT$_2$ as the delay signal DTM of the timer signal TMS and is used for generating the next timer signal TMS.

FIGS. 8C to 8F are timing diagrams of the input signals of the NOR gate NRGT$_2$, the output signal V$_{ND3}$ of the node ND$_3$, the timer signal TMS, and the delay signal DTM, respectively.

As shown in FIGS. 8C to 8F, the timer signal TMS is generated after T$_{D2}$ from the rising edge of the address transition signal ATS or the delay signal D$_{TM}$. Furthermore, the delay signal DTM is generated after T$_{D3}$ from the rising edge of the timer signal TMS.

As a result, even in the case when no access is made for a long period, the timer signal TMS is generated at intervals of T$_C$ by the timer 63 and, in response to this, the pump enable signal PENB is generated intermittently by the pulse generator 62 and the power consumed in the flash memory 130 is compensated during standby.

Here, the time T$_C$ is the sum of the delay time T$_{D2}$ and T$_{D3}$ of the delay circuit DLY$_2$ and DLY$_3$, namely, T$_C$=T$_{D2}$+T$_{D3}$.

FIGS. 9A to 9D are timing diagrams of the address data ADRDAT, the address transition signal ATS, the timer signal TMS, and the pump enable signal PENB. Below, the operations of the circuits of the second embodiment will be described in reference to the timing diagrams in FIGS. 9A to 9D and the circuit diagram in FIG. 5.

The address data ADRDAT is input to the address transition detector 61. A change in the address data ADRDAT is detected by the address transition detector 61. When a change of the address data ADRDAT is detected, the address transition signal ATS is output by the address transition detector 61 and is input to the pulse generator 62 and the timer circuit 63.

The pulse generator 62 receives the address transition signal ATS, generates the pulse signal of T$_P$ in width, and outputs this as the pump enable signal PENB. Then, in the same way as in the first embodiment, during the period when the pump enable signal PENB is set in the active state, the clock signal CLK is input to the booster circuit 30. As a result, a constant voltage V$_{OUT}$ is provided to the flash memory 130 by the power supply circuit 100a During standby, when no access is made for a long time in the flash memory 130, as shown in FIGS. 9A to 9D, after T$_C$ from the last address transition signal ATS, the timer signal TMS is generated by the timer 63 and input to the pulse generator 62. The pump enable signal PENB is generated in response to the input signal.

In this way, when the flash memory 130 is not accessed for a long time, the timer signal TMS is generated periodically by the timer 63. In response to this, the pump enable signal PENB is generated by the pulse generator 62. As a result, the booster circuit 30 operates intermittently and the power consumed in the flash memory 130 is restored intermittently.

Further, in the second embodiment, a power on control circuit 64 is provided. The power supply circuit is held in the operating state by the power on control circuit 64 for an interval of, for example, 10 μs, after the power is switched on so the output voltage V$_{OUT}$ of the power supply circuit rises rapidly. The power on control circuit 64 is not restricted in the second embodiment. For example, the power on control circuit can be applied to the first embodiment as well.

As mentioned above, the enable signal generator 60a is provided and the address transition signal ATS is generated by the address transition detector 61 when the address data ADRDAT changes. In response to this, the pump enable signal PENB is generated by the pulse generator. Further, when the flash memory is not accessed for a long time, a timer signal is generated at constant intervals by the timer 63 and output to the pulse generator. In response to this, the pump enable signal PENB is generated intermittently by the pulse generator 62 to control the operation of the power supply circuit. As a result, when the flash memory 130 is accessed, the power supply circuit operates and the power consumed during the access is restored. The power consumption of the power supply circuit during standby can be lowered and the operation of the flash memory etc. sustained longer as a result.

As described above, according to the power supply circuit of the present invention, the power consumption during standby can be reduced, the power consumed during standby can be restored intermittently, and the time for return from the standby state to the operating state can be shortened.

What is claimed is:

1. A power supply circuit comprising:
   an oscillator for generating a clock signal;
   a booster circuit for generating an output voltage having a different level than a power supply voltage level in response to the clock signal from the oscillator;
   a comparison means for comparing the output voltage of the booster circuit with a reference voltage and outputting a run/stop control signal to the oscillator in response to the result of the comparison; and an operation control means for holding the comparison means in an operating state during normal operation and holding at least the comparison means among the oscillator and the comparison means in a stopped state during standby operation.

2. A power supply circuit comprising:

an oscillator for generating a voltage signal;

a booster circuit for generating an output voltage having a different level than a power supply voltage level in response to the voltage signal from the oscillator;

a comparison means for comparing the output voltage of the booster circuit with a reference voltage and outputting a run/stop control signal to the oscillator in response to the result of the comparison; and an operation control means for holding the comparison means in an operating state during normal operation and making at least the comparison means among the oscillator and the comparison means operate at predetermined constant intervals during standby operation.

3. A power supply circuit as set forth in claim 2, wherein the operation control means controls the operation in response to a signal generated outside the power supply circuit.

4. A power supply circuit comprising:

an oscillator for generating a clock signal;

a booster circuit for generating an output voltage having a different level than a power supply voltage level in response to the clock signal from the oscillator and supplying the output voltage to a memory accessed in response to an address signal;

a comparison means for comparing the output voltage of the booster circuit with a reference voltage and outputting a run/stop control signal to the oscillator in response to the result of the comparison; and an operation control means for holding the comparison means in an operating state when the address signal changes and stopping at least the comparison means among the oscillator and the comparison means when the address signal has not changed for a predetermined time.

5. A power supply circuit comprising:

an oscillator for generating a clock signal;

a booster circuit for generating an output voltage having a different level than a power supply voltage level in response to the clock signal from the oscillator and supplying the output voltage to a memory device accessed in response to an address signal;

a comparison means for comparing the output voltage of the booster circuit with a reference voltage and outputting a run/stop control signal to the oscillator in response to the result of the comparison; and an operation control means for holding the comparison means in an operating state when the address signal changes and making at least the comparison means among the oscillator and the comparison means operate at predetermined constant intervals when the address signal has not changed for a predetermined time.

6. A power supply circuit as set forth in claim 5, comprising a wherein the operating control means for making the oscillator and the comparison means operate for a predetermined time after the power is turned on.

* * * * *